Aug. 28, 1923.
T. R. WIWI
ADVERTISING DEVICE
Filed Dec. 10, 1921
1,466,327
5 Sheets-Sheet 3
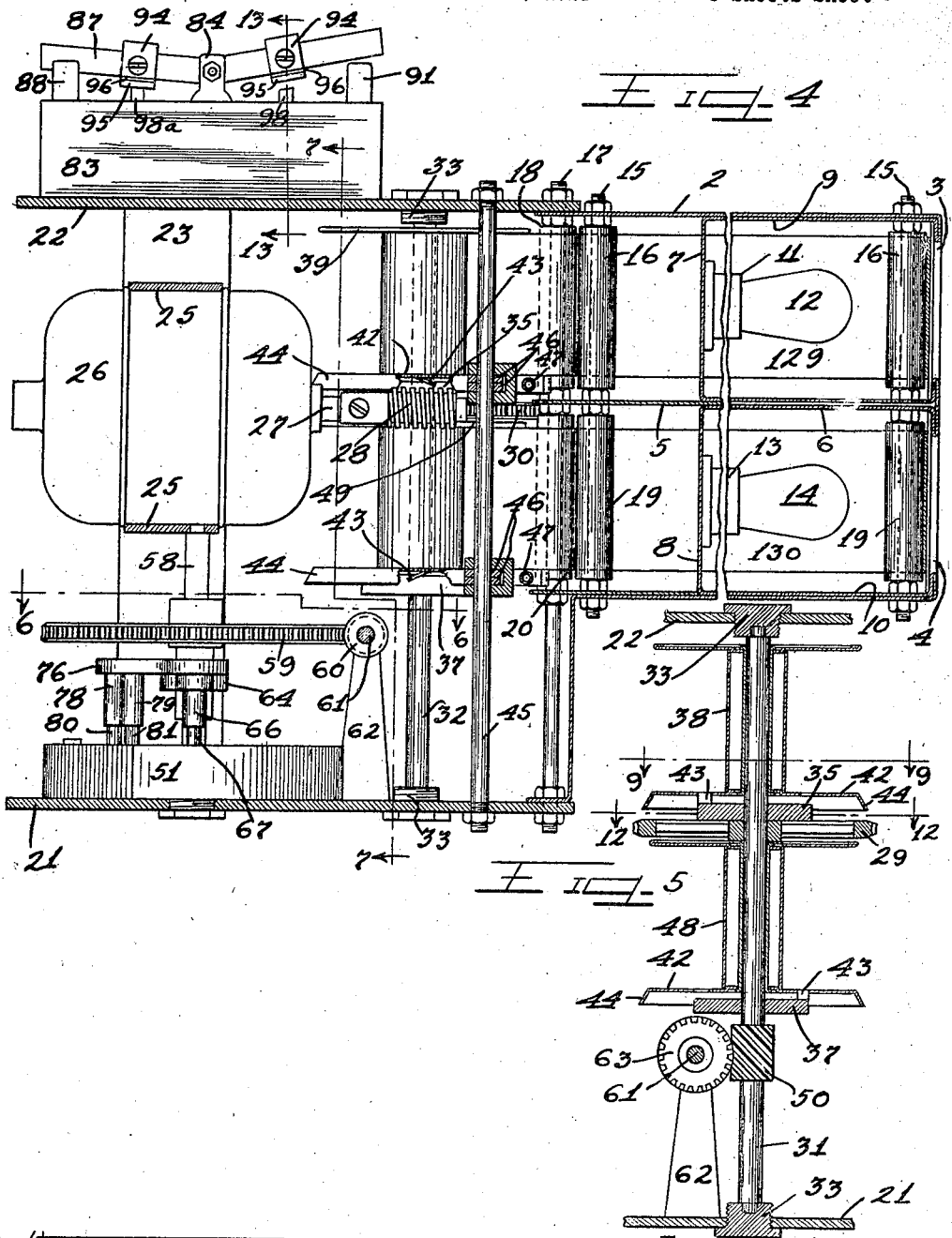
WITNESSES
INVENTOR
THOMAS R. WIWI Aug. 28, 1923.
T. R. WIWI
ADVERTISING DEVICE
Filed Dec. 10, 1921
1,466,327
5 Sheets-Sheet 4
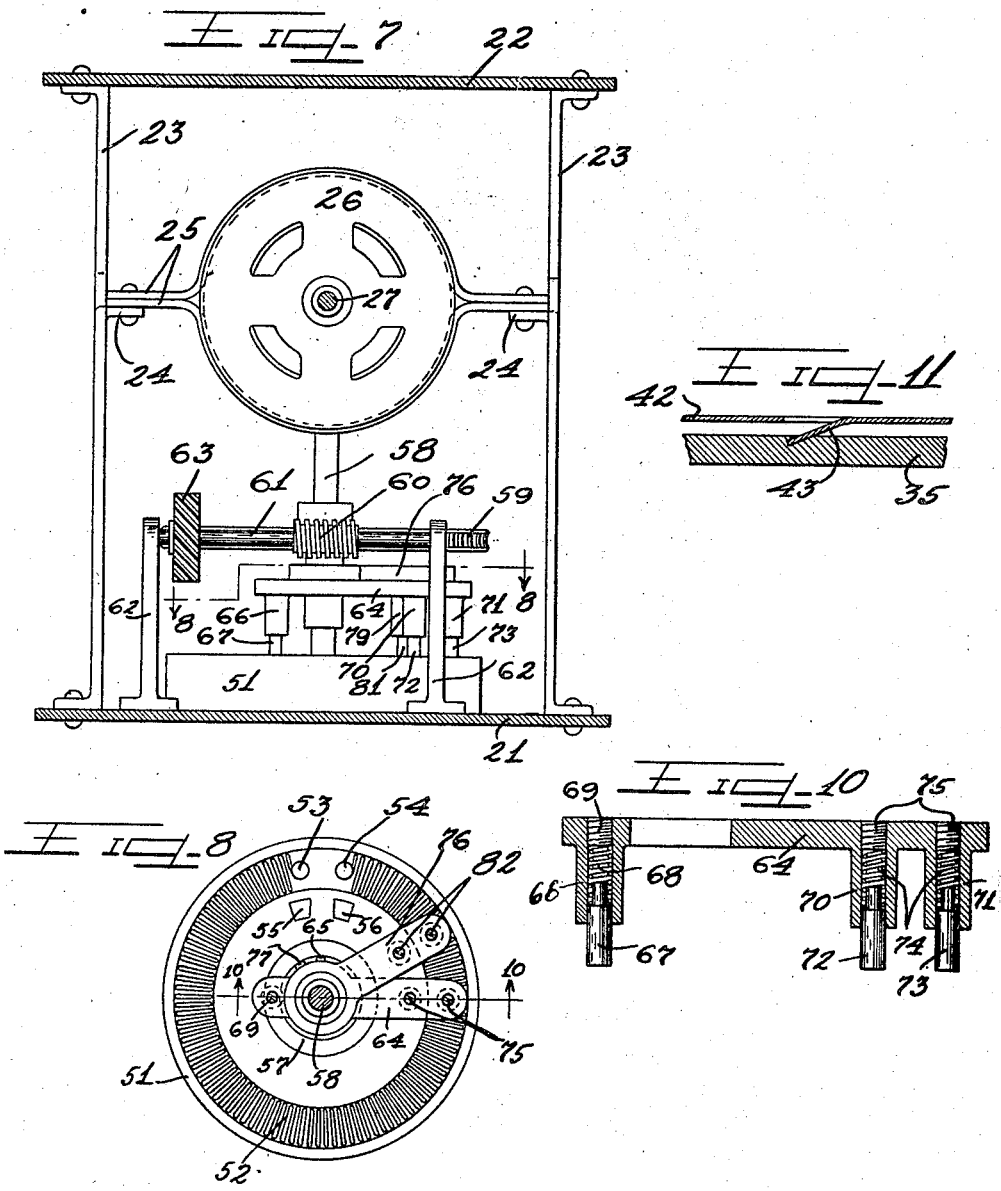

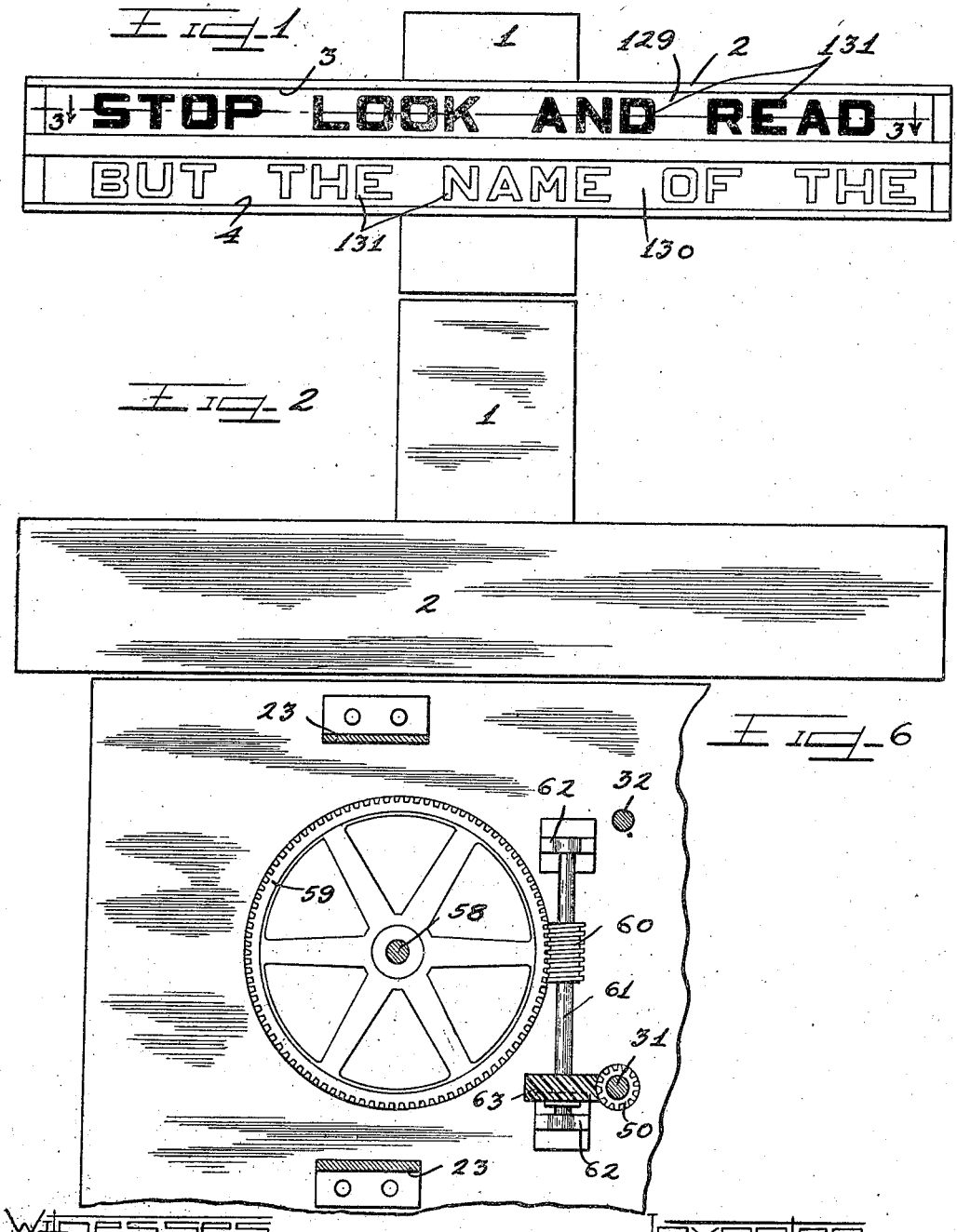

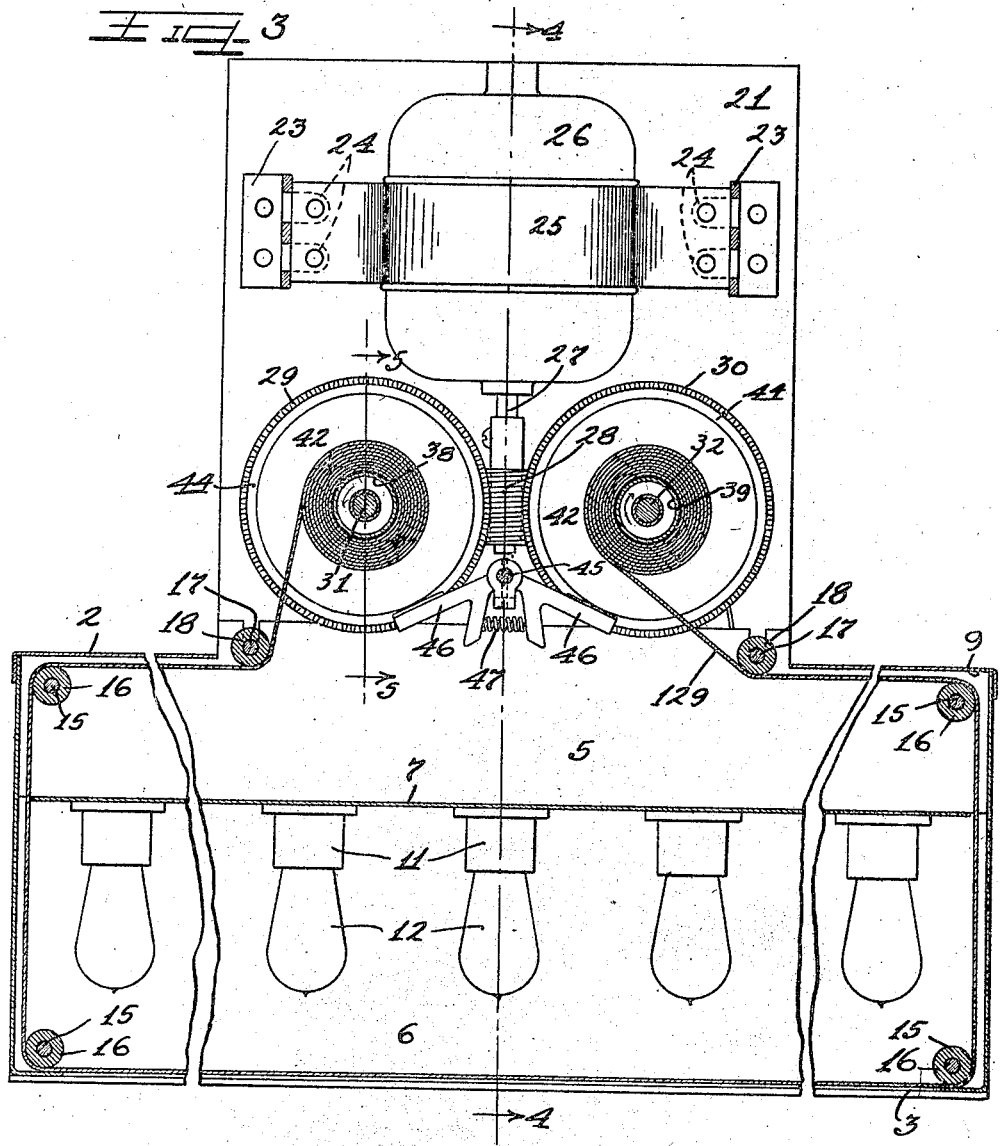

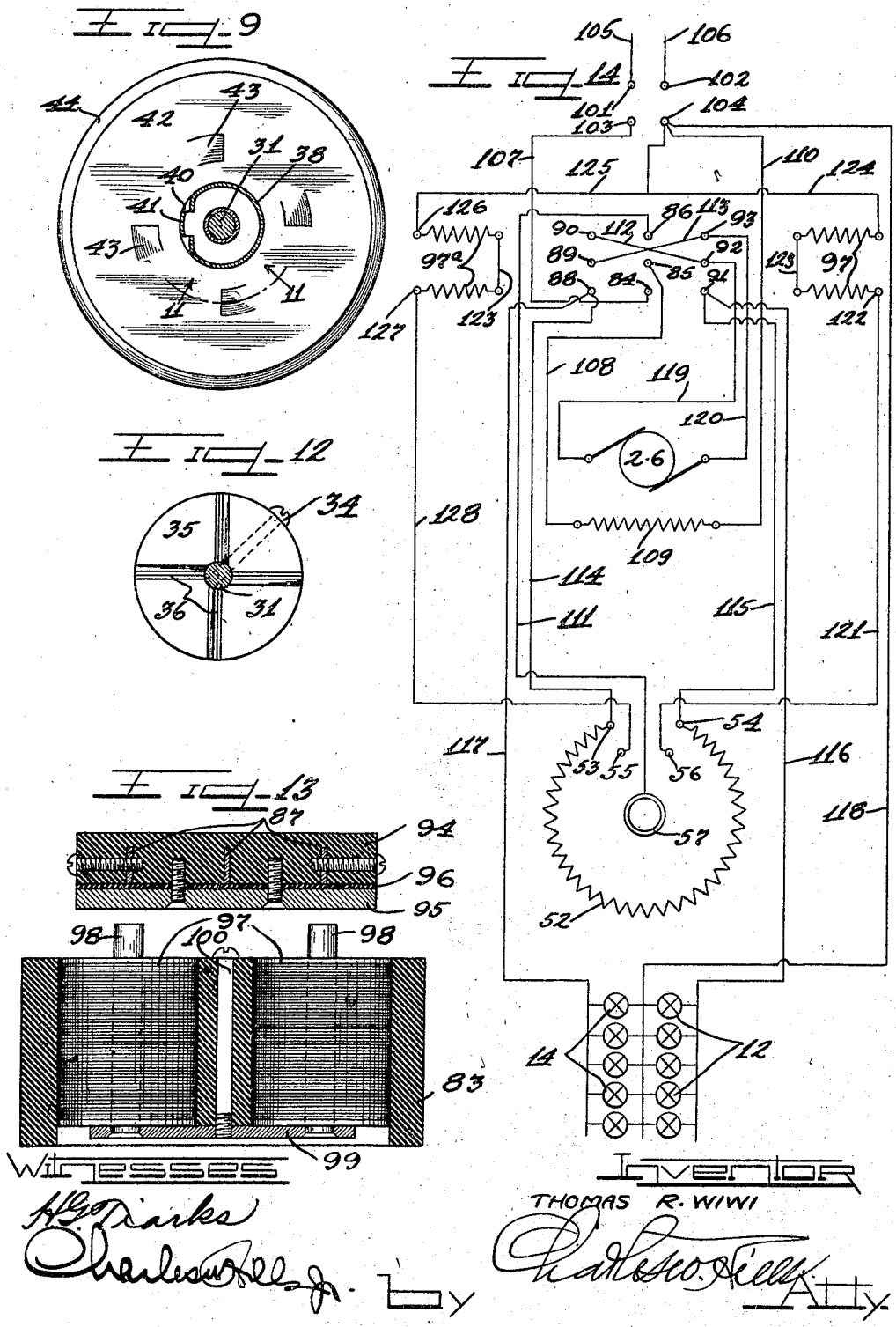

Patented Aug. 28, 1923.

1,466,327

UNITED STATES PATENT OFFICE.

THOMAS R. WIWI, OF CHICAGO, ILLINOIS, ASSIGNOR OF FORTY-FIVE PER CENT TO WILLIAM H. DEAN, OF CHICAGO, ILLINOIS.

ADVERTISING DEVICE.

Application filed December 10, 1921. Serial No. 521,321.

*To all whom it may concern:*

Be it known that I, THOMAS R. WIWI, a citizen of the United States, and a resident of the city of Chicago, in the county of Cook and State of Illinois, have invented certain new and useful Improvements in an Advertising Device; and I do hereby declare that the following is a full, clear, and exact description of the same, reference being had to the accompanying drawings, and to the numerals of reference marked thereon, which form a part of this specification.

This invention relates to an improved type of an advertising device adapted for use in window displays embracing traveling perforated sign tapes one of which is illuminated and travels across an advertising space, while the other tape moves without being illuminated in an opposite direction to be rewound ready to be displayed after the first display tape has run its full length and is ready to be automatically reversed and rewound ready for reuse.

It is an object of this invention to provide an improved illuminated advertising device having traveling signs adapted to be repeatedly run across display openings in a sign casing.

It is also an object of the invention to provide an advertising device wherein motor driven spools are adapted to wind and unwind advertising ribbons or tapes which are conducted across casing openings in front of illuminating means to display words or symbols on said tapes.

It is a further object of the invention to provide an advertising device having a movable advertising ribbon adapted to be unwound from one spool as it is wound upon another by means of a motor adapted to be reversed at a predetermined time by a control mechanism adapted to be set to cause operation of a reversing switch when the end of the advertising ribbon is reached.

Another object of the invention is to provide an advertising device for display windows and the like, said device having a ribbon with words punched therein adapted to be illuminated as the ribbon is pulled across a casing opening, said ribbon further adapted to be reversed and the illuminating means extinguished when the end of the ribbon is reached to permit the ribbon to be moved in a reverse direction by the automatic reversal of a driving motor caused by a mechanism adjusted to correspond to the particular length of the advertising ribbon.

It is furthermore an object of the invention to provide an advertising device with advertising ribbons adapted to be simultaneously moved in opposite directions and controlled by a motor reversing switch mechanism adapted to be operated at predetermined times by a governing device set to correspond to the length of the ribbons used.

Another object of the invention is to provide an advertising device wherein a ribbon bearing advertisements is adapted to be illuminated while moving in one direction, but is not illuminated when it is moving in an opposite direction.

It is an important object of this invention to provide a simple and effective advertising machine primarily adapted for window display advertising and embracing automatically operating mechanisms adapted to be set to operate at predetermined times depending upon the length of advertising ribbons which are adapted to be moved in opposite directions, with one of said ribbons illuminated to permit reading thereof as the other ribbon is returned to its normal position.

Other and further important objects of this invention will be apparent from the disclosures in the specification and the accompanying drawings.

The invention (in a preferred form) is illustrated in the drawings and hereinafter more fully described.

On the drawings:

Figure 1 is a front elevation of the advertising device.

Figure 2 is a top plan view thereof.

Figure 3 is an enlarged horizontal section taken on line 3—3 of Figure 1.

Figure 4 is a vertical section taken on line 4—4 of Figure 3 with parts shown in elevation.

Figure 5 is a detail section partly in elevation taken on line 5—5 of Figure 3.

Figure 6 is a fragmentary plan view taken on line 6—6 of Figure 4.

Figure 7 is a sectional view taken on line 7—7 of Figure 4.

Figure 8 is a detail plan view taken on line 8—8 of Figure 7.

Figure 9 is an enlarged detail section taken on line 9—9 of Figure 5.

Figure 10 is an enlarged fragmentary detail section taken on line 10—10 of Figure 8, showing parts in elevation.

Figure 11 is a fragmentary detail section taken on line 11—11 of Figure 9.

Figure 12 is a detail view taken on line 12—12 of Figure 5.

Figure 13 is an enlarged detail section of the motor reserving switch taken on line 13—13 of Figure 4.

Figure 14 is a wiring diagram of the device.

As shown on the drawings:

The reference numeral 1 indicates a mechanism casing or housing having rigidly secured across the front thereof a display box 2 having long narrow openings 3 and 4 in the front wall thereof one above the other. The box 2 is long and projects beyond the sides of the casing 1, as illustrated in Figures 1 and 2. The box 2 is divided by horizontal partitions 5 and 6 and longitudinal vertical partitions or walls 7 and 8. The partitions 5 and 6 divide the interior of the box 2 into an upper chamber 9 and a lower chamber 10. Mounted upon the front surface of the wall 7 are a plurality of electric light sockets 11 having electric light bulbs 12 engaged therein. A plurality of electric light sockets 13 and bulbs 14 are also mounted upon the wall 8 in the lower chamber 10. Rotatably mounted in each of the four corners of the upper box chamber 9 on a rod or spindle 15 is a vertical roller 16. Also rotatably mounted on vertical spindles or rods 17 where the box chamber 9 opens into the casing 1 are a pair of vertical guide rollers 18. The rods 15 project downwardly through the lower box chamber 10 and have rollers 19 rotatably engaged thereon. Guide rollers 20 are rotatably engaged on the rods 17 within the box chamber 10.

Mounted within the casing 1 is a mechanism supporting frame comprising a bottom plate 21 and a top plate 22 connected to one another by channel uprights 23. Lugs 24 are struck inwardly from the uprights 23. Rigidly secured to the lugs 24 are the ends of a pair of brackets or straps 25 which engage around a series motor 26 and hold the same suspended in position. Secured on the motor shaft 27 is a worm 28 which meshes with a pair of large worm wheels or gears 29 and 30 to drive the same in opposite directions. The worm gears 29 and 30 are respectively keyed or otherwise secured to upright shafts 31 and 32 which are journalled in bearing members 33 mounted on the frame plates 21 and 22, as illustrated in Figure 4.

Rigidly secured by means of a screw 34 or other suitable means on each of the shafts 31 and 32 directly above the respective worm gears 29 and 30 is a disk 35 having a plurality of radial grooves 36 in the top surface thereof. A similarly grooved disk 37 is also secured on each of the shafts 31 and 32 below the worm gears 29 and 30. Rotatable spools or reels 38 and 39 are respectively mounted on the shafts 31 and 32 above the disks 35. The shank of each reel is slit at 40 to afford a strap 41 to permit one end of a film or ribbon to be connected with the reel. The bottom plate 42 of each reel has struck downwardly therefrom a plurality of springs or resilient fingers 43 adapted to coact with the grooved disks 35 to permit rotation of the reels on the shafts 31 and 32 in one direction only. An inclined or beveled flange 44 is integrally formed on the bottom plates 42 of each of the upper reels 38 and 39.

Supported by the frame plates 21 and 22 between and a little to the front of the shafts 31 and 32 is a rod or shaft 45. Pivotally supported on the shaft 45 in the plane of the inclined flanges 44 of the reel plates 42 are two brake shoes 46 impelled by means of a spring 47 against the surfaces of said flanges 44. A second or lower pair of spring impelled brake shoes 46 are also pivotally mounted on the shaft 45 for coaction with the inclined flanges 44 of a pair of lower spools or reels 48 and 49. The lower reels 48 and 49 are rotatably engaged on the respective shafts 31 and 32 below the worm gears 29 and 30 and above the lower locking disks 37.

Secured on the lower portion of the shaft 31 is a worm 50 adapted to impart a drive to a switch control mechanism mounted on the frame plate 21 below the motor 26, and comprising a circular base or block 51 made of insulating material and having embedded in a circular groove thereof a wire resistance coil 52, the ends of which are secured to terminal tips or members 53 and 54. Also mounted on the insulation block 51 are two terminal members 55 and 56. A flat metal contact ring 57 is mounted centrally upon the insulation block 51. Journalled centrally upon the block 51 is the lower end of a vertical shaft 58, the upper end of which is journalled in the lower motor supporting strap 25. Secured on the shaft 58 is a large worm gear or wheel 59 which meshes with a driving worm 60 keyed on a horizontal shaft 61. The shaft 61 has the ends thereof journalled in upright standards or brackets 62 which are rigidly secured upon the lower frame plate 21. Rigidly secured on the shaft 61 is a worm wheel or gear 63 which is in mesh with the driving worm 50 on the shaft 31.

Rotatably engaged on the shaft 58 below the worm wheel 59 is a brush holder or bar 64 adapted to be held in an adjusted or set position locked to the shaft 58 by a set screw 65. Formed on the bottom of the inner end of the brush holder 64 is a sleeve 66 in the lower end of which a brush 67 is slidably engaged. The brush 67 is held in contact with the ring 57 by means of a coiled spring 68 disposed within the sleeve 66 below a plug 69. Formed on the bottom of the outer end of the brush holder 64 are two sleeves 70 and 71 having brushes 72 and 73 respectively slidably engaged therein and held projected by means of coiled springs 74 engaged within said sleeves below plugs 75. Rotatably engaged on the shaft 58 above the brush holder 64 is the inner end of a brush holder 76. A set screw 77 is adapted to hold the brush holder 76 locked in a set position on the shaft 58 with respect to the lower brush holder 64. Integrally formed on the bottom of the outer end of the brush holder 76 are two sleeves 78 and 79 having brushes 80 and 81 respectively adjustably engaged therein and held projected by coiled springs seated in said sleeves below plugs 82.

For reversing the rotation of the motor 26 a triple pole double throw knife switch is mounted upon the top frame plate 22 or in any other convenient position. The motor reversing switch comprises a base block 83 having mounted on the top thereof three brackets or posts 84, 85 and 86, on which are fulcrumed angled or bell crank switch blades 87. Also mounted upon one end of the top surface of the switch block 83 are split blade receiving contact posts 88, 89 and 90. Split blade receiving contact posts 91, 92 and 93 are mounted upon the top of the other end of the switch block 83. Connecting the switch blades 87 on each side of the pivotal mounting thereof is a bar of insulating material 94 on the bottom of which is secured a metal conductor bar 95. A strip of insulating material 96 is positioned between the bars 94 and 95, as illustrated in Figure 13. The switch block 83 is provided with four cylindrical openings having solenoids 97 and 97$^a$ seated therein each provided with a core 98 and 98$^a$ respectively. The solenoids are arranged in pairs 97 and 97$^a$ on opposite sides of the transverse middle section of the switch block 83. The lower ends of the cores 98 of each pair of solenoids are connected by a metal bar 99 which is secured to the bottom of the switch block 83 by means of a screw 100.

Figure 14 is a wiring diagram of the device and includes a double pole single throw line switch having terminals 101, 102, 103 and 104. Line wires 105 and 106 are respectively connected to the line switch terminals 101 and 102. A wire 107 has one end connected to the line switch terminal 103 and the other end connected to the terminal post 84 of the motor reversing switch. Connected to the switch terminal 85 is one end of a wire 108, the other end of which is connected to one end of the motor field coil 109. The other end of the motor field coil 109 is connected with the line switch terminal 104 by a wire 110. Attached to the switch terminal 86 is one end of a wire 111, the other end of which is connected to the contact ring 57. The switch terminals 90 and 92 are connected by a cross wire 112, while the switch terminals 89 and 93 are connected by a cross wire 113. The switch terminal 88 is connected to the resistance coil terminal 53 by a wire 114. The other resistance coil terminal 54 is connected to the switch terminal 91 by a wire 115. Also attached to the switch terminal 91 is one end of a wire 116, the other end of which is connected to the lamps 12. A wire 117 is connected to the switch terminal 88 and to the lamps 14. Connected to the lamps 12 and 14 is a wire 118, the other end of which is connected to the line switch terminal 104. Connected to the switch terminal 92 is one end of a wire 119, the other end of which is connected to one of the brushes of the motor 26. Attached to the other brush of the motor 26 is one end of a wire 120, the other end of which is connected to the switch terminal 93.

Attached to the terminal 56 is one end of a wire 121, the other end of which is connected to one terminal 122 of one pair of the solenoid coils 97. The two coils in each pair of solenoids 97 are connected in series by a wire 123. Connected to the solenoid terminal is one end of a wire 124 having the other end connected to the line switch terminal 104. A wire 125 is also connected to the line switch terminal 104 and to the solenoid terminal 126 of the second set of solenoids 97$^a$. Connected to the solenoid terminal 127 is one end of a wire 128, the other end of which is connected to the terminal 55 on the resistance coil block 51.

The operation is as follows:

The advertising machine is provided with an upper film or ribbon 129 and a lower film or ribbon 130, each provided with advertising words, symbols or characters 131 formed by cutting out or stamping the ribbons. One end of the upper ribbon 129 is engaged on the strap of the upper reel 39, while the other end of the ribbon 129 is connected to the strap 41 of the upper reel 38. The upper ribbon 129 is trained to engage the upper guide rollers 16 and 18, as illustrated in Figure 3, so that the film travels across the upper box opening 3, as shown in Figure 1. The lower film 130 is similarly connected with the lower reels 48 and 49 and is trained to engage around the lower guide rollers 19 and 20 in the lower box chamber 10. The upper ribbon 129 is adapted to be wound on one of the reels 38 or 39 as it is unwound from the other. The same is true with respect to the lower ribbon 130 and the reels 48 and 49. When the machine is operating one of the ribbons is illuminated and travels across the front of the display box 2 in a direction to permit the words on the ribbon to be read consecutively, while the other film is not illuminated and moves in an opposite direction to be rewound on its feeding reel. The two films are of equal length so that when one ribbon starts to unwind from its feeding reel the other ribbon starts to wind up upon its feeding reel. The feeding reels are the reels 39 and 49.

The motor control switch is positioned with the blades 87 thereof either engaged with the switch terminals 88, 89 and 90, as illustrated in Figure 4, or with the terminals 91, 92 and 93. With the motor control switch set with the blades 87 contacting the switch terminals 91, 92 and 93, the machine is started by closing the line switch. When the machine is started the upper ribbon 129 is wound up upon the reel 39 and connected to the reel 38, while the lower ribbon 130 is wound up upon the reel 48 ready to be wound upon the lower reel 49. At the starting of the machine the brush holder 76 is rotated on the shaft 58 by loosening the set screw 77, into a position wherein the brushes 80 and 81 are respectively in contact with the motor speed control terminals 54 and 56. The set screw is then tightened to hold the brush holder locked to the shaft 58. The machine is permitted to run until the end of the ribbon on reel 39 is reached. When this takes place, the machine is stopped by opening the line switch. The long brush holder 64 is now rotated on the shaft 58 by loosening the set screw 65. The brush holder 64 is rotated on the shaft 58 until the brushes 73 and 72 respectively contact the motor speed control terminals 53 and 55. The set screw 65 is now tightened to hold the brush holder 64 locked to the shaft 58 and set with respect to the brush holder 76 corresponding to the length of the display ribbons. The machine may thus be set for ribbons of different lengths. The brush holders 76 and 64 are only required to be set once with respect to one another for a given length of ribbon. The setting of the brush holders determines when the motor control switch shall be operated to cause reversal of the motor 26.

As above described, the brush holder 76 has moved off of the terminals 54 and 56 and is set with respect to the brush holder 64 which has the brushes 73 and 72 thereof respectively in contact with the terminals 53 and 55. When this condition exists with the line switch closed the solenoids 97ª are energized thereby magnetizing the solenoid cores 98ª which attract the switch bar 95 thereabove causing the switch blades 87 to be rocked and pulled into contact with the switch terminals 88, 89 and 90, thereby reversing the motor 26.

The driving worm 28 on the motor shaft 27 is thus rotated in an opposite direction whereby the direction of the rotation of the worm wheels 29 and 30 is also changed. The reel shafts 31 and 32 are now rotated in a direction to cause the upper ribbon 129 to be unwound from the reel 38 upon the reel 39, while the lower ribbon 130 is unwound from the reel 49 and wound upon the reel 48 thereby permitting the lower traveling sign 130 to be read as it moves from left to right across the lower box opening 4 looking at Figure 1. With the throw of the motor control switch the upper lights 12 are extinguished and the lower lights 14 are lighted to illuminate the lower traveling sign ribbon 130.

With the reversal of the motor the shaft 58 is rotated in the opposite direction thereby moving the brush holder 64 away from the terminals 53 and 55 and the brush holder 76 toward the terminals 54 and 56. The brush 67 is continually in contact with the ring 57 and the brushes 73 and 80 move over the resistance or rheostat coil 52. The resistance in the motor circuit is thus continuously varied to govern the speed of rotation of the reel shafts 31 and 32 and the reels thereon to compensate for the differences in diameter of the rolls of ribbon on the reels as the ribbons are wound upon one reel and unwound from another. The ribbons thus move across the box openings 3 and 4 at substantially a constant speed.

When the brushes 80 and 81 reach the terminals 54 and 56 respectively on the block 51, the solenoids 97 act to automatically reserve the motor control switch, thereby causing the lights 14 to be extinguished as the lights 12 are lighted. The upper ribbon 129 is illuminated as illustrated in Figure 1 and moves across the box opening 3 from left to right to be read as the lower ribbon moves in the opposite direction.

To prevent overthrow of the reels when the ends of the ribbons are reached the spring impelled brake shoes 46 are held in frictional engagement with the inclined flanges 44 of the reels.

The reels 38 and 39, and the reels 48 and 49 are arranged with the spring fingers 43 on the plate 42 thereof directed in opposite directions to permit one of the reels of each pair to be driven by its respective grooved disk 35 or 37 while the other reel of said pair may be driven by its respective grooved disk or rotate faster than the same with the spring fingers 43 slipping over the upper surface of the disk as the diameter of the ribbon roll on said reel is decreased. This arrangement of the reels and the grooved driving disks 35 and 37 on the shafts 31 and 32 compensates for the differences in diameters of the rolls of ribbons as they are increased or decreased while the ribbons are being unwound from one reel and wound upon the other.

With the motor speed regulating device embracing the resistance coil 52 and the brush mechanisms, and the reel driving and slip mechanisms, the display films or ribbons are adapted to move across the box openings 3 and 4 at uniform rates of speed.

Display ribbons of different lengths may be used in the machine by adjusting the brush holders 56 and 64 with respect to one another and locking the same to the shaft 58 by set screws or other suitable means. The two ribbons used at the same time are of course of the same length. Adjustment of the brush holders 56 and 64 controls the solenoids which in turn act to throw the motor control switch thereby causing reversal of the series motor, which acts to reverse the direction of drive of the reel shafts 31 and 32. The ribbons are thus permitted to move in one direction and then in the other depending upon the length of the ribbons and the advertising matter thereon. The lights 12 and 14 burn alternately depending upon which ribbon is moving in a direction to be read.

It will of course be understood that the machine may be equipped with a shunt motor in place of the series motor 26 by simply changing the wiring connections.

If preferred, different colored lights may be used to cause different coloring of the advertising words or symbols as they are moved past the lights.

I am aware that numerous details of construction may be varied through a wide range without departing from the principles of this invention, and I therefore do not purpose limiting the patent granted otherwise than necessitated by the prior art.

I claim as my invention:

1. An advertising device comprising a casing, a display box supported thereon having display openings therein, advertising ribbons within said box, means in said casing for moving said ribbons across said openings simultaneously in opposite directions, means for illuminating the one of said ribbons moving in the proper direction, and means for reversing the direction of movement of the ribbons and causing the illuminating means to change to another ribbon.

2. An advertising device comprising a casing, a display box supported thereon having display openings therein, advertising ribbons in said box, mechanisms in said casing for moving said ribbons across said box openings in opposite directions, means for illuminating one ribbon at a time, and a reversing mechanism connected with said moving mechanisms adapted to act at predetermined times to alternately reverse the direction of movement of said ribbons.

3. An advertising device comprising a casing, a box thereon having display openings therein, a plurality of advertising ribbons in said box, means connected therewith for moving the ribbons across said openings in opposite directions, illuminating means in said box for illuminating one ribbon at a time, a driving device connected with said ribbon moving means for operating the same, a mechanism connected with said driving device for varying the driving speed thereof, and a switch means connected with said driving device and with said speed control mechanism adapted to be automatically controlled by said speed control mechanism to cause automatic operation of the switch at predetermined times to reverse the drive of the driving device whereby the direction of movement of said ribbons is reversed.

4. An advertising device comprising an advertising ribbon, rotatable reels to which the ribbon is connected, means for driving the reels in opposite directions to permit the ribbon to be wound on one of said reels as it is unwound from the other, a switch connected with the driving means, means for automatically operating said switch to cause reversing of the drive imparted by said driving means, and adjustable mechanisms connected with said switch operating means to cause the same to operate at predetermined times depending upon the length of said advertising ribbon.

5. An advertising device comprising an advertising ribbon, a pair of shafts, grooved driving disks secured thereon, reels rotatably engaged on said shafts above said grooved disks, said reels having the advertising ribbon engaged thereon, spring fingers struck from said reels to co-act with said grooved disks to cause movement of said ribbon from one reel to the other, worm gears secured on said shafts, a motor, and a worm driven by the motor and in mesh with said worm gears to cause a drive to be imparted to said shafts.

6. An advertising device comprising an advertising ribbon, a pair of shafts, grooved driving disks secured thereon, reels rotatably engaged on said shafts, grooved disks secured to said shafts below said reels, said reels having the ribbon wound thereon, spring members on said reels for co-action with said grooved disks to cause winding of the ribbon on one reel as it is unwound from the other, worm gears secured to said shafts, a worm meshing with said worm gears to rotate the same in opposite directions, a motor for driving said worm, a switch connected with the motor, means for automatically operating said switch to cause reversing of the motor, a control mechanism governing the operation of said switch operating means, and mechanisms connecting said control mechanism with one of said shafts to receive a drive therefrom.

7. An advertising device comprising advertising ribbons, reels on which said ribbons are adapted to be alternately wound and unwound, shafts on which said reels are engaged, spring members on said reels, driving disks secured on said shafts to co-act with said spring members to cause rotation of said reels, worm gears secured on said shafts, a motor, a driving worm secured on the motor shaft and meshing with said worm gears to drive the same in opposite directions, and means connected with the motor for varying the speed thereof to compensate for the increase and decrease of the diameters of the rolls of ribbons on said reels to cause the ribbons to move from one reel to another at a constant speed.

8. An advertising device comprising ribbons having advertising matter thereon, means for illuminating one of said ribbons at a time, reels on which said ribbons are adapted to be alternately wound and unwound, shafts on which said reels are rotatably engaged, resilient members on said reels, driving disks secured on said shafts to co-act with said resilient members to cause rotation of said reels, brake shoes frictionally engaging said reels, worm gears secured on said shafts, a motor, a driving worm secured on the motor shaft and meshing with said worm gears to drive the same in opposite direction, a switch connected with the motor, solenoids for operating said switch to cause reversing of the motor, a resistance device connected with the motor and switch, adjustable control members co-acting with said resistance device for varying the speed of the motor and causing operation of the solenoids at predetermined times whereby the switch is automatically operated, and means connecting said control members with one of said shafts to receive a drive therefrom.

9. An advertising device comprising signs, driving means for moving the signs in opposite directions, means for causing the reversal of movement of said signs at predetermined times, and illuminating means controlled by the reversing means for alternate lighting of said signs.

10. An advertising device comprising a plurality of signs, driving means for moving the signs in opposite directions, electrically controlled means for automatically reversing the direction of movement of said signs, and adjustable means connected therewith to cause the same to operate at predetermined times depending upon the length of said signs.

11. An advertising device comprising a plurality of signs, driving means for simultaneously moving the signs in opposite directions, and speed control means connected with the driving means to vary the speed thereof to cause said signs to move at a constant speed.

12. An advertising device comprising a plurality of moving signs, means for illuminating one of said signs at a time, and variable speed mechanisms for driving said signs in opposite directions at a constant rate of speed.

13. An advertising device comprising a plurality of reels, brakes engaging the same, an advertising ribbon adapted to be wound on one of said reels as it is unwound from the other, means for driving one of said reels and permitting slippage of the other, a motor for operating said means, a switch mechanism for reversing said motor, a resistance mechanism connected with the switch mechanism to govern the operation thereof, and adjustable members adapted to be set with respect to one another depending upon the length of said ribbon and co-acting with said resistance mechanism to vary the speed of the motor and cause automatic operation of said switch mechanism.

14. In an advertising device of the class described the combination with advertising members and driving means therefor, of adjustable means driven from the driving means for varying the speed of said driving means to cause said advertising members to move at a constant speed.

In testimony whereof I have hereunto subscribed my name in the presence of two subscribing witnesses.

THOMAS R. WIWI.

Witnesses:
 FRED E. PAESLER,
 JAMES M. O'BRIEN.